(12) United States Patent
Matić et al.

(10) Patent No.: US 12,386,613 B2
(45) Date of Patent: Aug. 12, 2025

(54) NATURAL LANGUAGE CODE AND COMMENT COMPLETION GENERATOR

(71) Applicant: MIKROELEKTRONIKA D.O.O., Belgrade (RS)

(72) Inventors: Nebojša Matić, Belgrade (RS); Ivan Rajković, Belgrade (RS)

(73) Assignee: MikroElektronika D.O.O., Belgrade (RS)

( * ) Notice: Subject to any disclaimer, the term of this patent is extended or adjusted under 35 U.S.C. 154(b) by 0 days.

(21) Appl. No.: 17/864,381

(22) Filed: Jul. 13, 2022

(65) Prior Publication Data
US 2023/0244479 A1 Aug. 3, 2023

Related U.S. Application Data

(60) Provisional application No. 63/304,569, filed on Jan. 28, 2022.

(51) Int. Cl.
*G06F 8/73* (2018.01)

(52) U.S. Cl.
CPC ...................... *G06F 8/73* (2013.01)

(58) Field of Classification Search
CPC ........................................ G06F 8/73
See application file for complete search history.

(56) References Cited

U.S. PATENT DOCUMENTS

| | | | | |
|---|---|---|---|---|
| 7,287,273 B2* | 10/2007 | Shoji | ................... | H04L 63/0861 |
| | | | | 713/182 |
| 7,444,278 B2* | 10/2008 | Bennett | ................... | G06F 9/454 |
| | | | | 704/277 |
| 7,865,506 B1* | 1/2011 | Pedersen | ........... | H04M 1/72445 |
| | | | | 707/726 |
| 8,669,988 B2 | 3/2014 | Anderson et al. | | |
| 9,015,730 B1* | 4/2015 | Allen | ...................... | G06F 9/466 |
| | | | | 719/310 |
| 9,519,464 B2 | 12/2016 | Dang et al. | | |
| 9,591,099 B1* | 3/2017 | Pittman | ................... | G06F 3/067 |
| 9,647,905 B1* | 5/2017 | Pittman | ............... | H04L 41/0896 |
| 10,223,082 B2 | 3/2019 | King et al. | | |
| 10,353,796 B2 | 7/2019 | Frenkiel et al. | | |
| 10,795,550 B1* | 10/2020 | Grayson | ............... | G06F 3/0481 |
| 10,853,103 B2 | 12/2020 | Zhu et al. | | |
| 10,922,357 B1* | 2/2021 | Chennuru | ........... | G06F 16/2457 |
| 10,969,954 B2* | 4/2021 | Jaygarl | ................... | G06F 9/451 |

(Continued)

FOREIGN PATENT DOCUMENTS

EP 3011442 B1 4/2016

OTHER PUBLICATIONS

Raychev, V. et al., Code Completion with Statistical Language Models, Jun. 9-11, 2014, PLDI'14, ACM, United Kingdom.

(Continued)

*Primary Examiner* — Douglas M Slachta
(74) *Attorney, Agent, or Firm* — The Harris Firm (57) ABSTRACT

A method comprising, transmitting, from an API server to a backend server, one or more domain knowledge files; receiving, at the API server, a natural language input; transmitting the natural language input from the API server to the backend server; receiving, at the API server, a one or more snippets of executable code, one or more comments, or one or more values. A system and computer-readable medium are also disclosed.

20 Claims, 8 Drawing Sheets

(56) References Cited

U.S. PATENT DOCUMENTS

| | | | |
|---|---|---|---|
| 11,010,550 B2 | 5/2021 | Bellegarda et al. | |
| 11,455,148 B2* | 9/2022 | Trim | G06N 5/04 |
| 11,715,006 B2* | 8/2023 | Bird | G06F 8/36 |
| | | | 707/707 |
| 2009/0254880 A1 | 10/2009 | Gryko et al. | |
| 2012/0173612 A1* | 7/2012 | Vegesna-Venkata | |
| | | | H04L 67/143 |
| | | | 709/203 |
| 2015/0286720 A1* | 10/2015 | Walsh | G06F 16/95 |
| | | | 707/804 |
| 2015/0339394 A1* | 11/2015 | Jinq | G09B 19/00 |
| | | | 715/776 |
| 2016/0210353 A1* | 7/2016 | Holmes | G10L 15/08 |
| 2016/0357519 A1* | 12/2016 | Vargas | G06F 40/40 |
| 2017/0048254 A1* | 2/2017 | Avi-Dan | G06F 21/62 |
| 2019/0158569 A1* | 5/2019 | Singleton, IV | H04L 67/75 |
| 2020/0175886 A1* | 6/2020 | Jain | G16H 20/70 |
| 2020/0193402 A1* | 6/2020 | Egan | G06Q 20/202 |
| 2020/0394270 A1* | 12/2020 | Kaur | G06F 40/263 |
| 2021/0089587 A1* | 3/2021 | Gupta | G06F 16/90332 |
| 2021/0232644 A1* | 7/2021 | Shah | H04L 67/01 |
| 2021/0303989 A1* | 9/2021 | Bird | G06F 16/95 |
| 2022/0269649 A1* | 8/2022 | Moussa | G06F 16/1752 |
| 2022/0309037 A1* | 9/2022 | Gutierrez | G06F 16/93 |
| 2023/0122616 A1* | 4/2023 | Graham | G06Q 20/40 |
| | | | 713/186 |
| 2023/0305822 A1* | 9/2023 | Ferrucci | G06N 20/00 |

OTHER PUBLICATIONS

Svyatkovskiy, A., et al., Pythia: AI-Assisted Code Completion System, Nov. 29, 2019, Proceedings of the 25th ACM SIGKDD Int'l Conf. on Knowledge Discovery & Data Mining KDD'19.

Rahman, M., et al., A Neural Network Based Intelligent Support Model for Program Code Completion, 2020, vol. 2020, Hindawi Scientific Programming.

Nijkamp, E., et al., A Conversational Paradigm for Program Synthesis, Mar. 25, 2022, Salesforce Research, Retrieve at https://arxiv.org/pdf/2203.13474v3.pdf?

* cited by examiner

```
What is the code display the sum of 74 and 41?
```

8876

```
Num1 = 74
Num2 = 41
Sum = Num1 + Num2
Print(Sum)
```

NATURAL LANGUAGE CODE AND COMMENT COMPLETION GENERATOR

BACKGROUND

Field

Embodiments of the present disclosure relate to methods and systems for natural language code and comment completion generation.

Description of Related Art

U.S. Ser. No. 11/010,550 discloses a non-transitory computer-readable storage medium storing one or more programs, the one or more programs comprising instructions, which when executed by one or more processors of an electronic device, cause the electronic device to: receive a character of a sequence of characters; determine a current character context based on the received character of the sequence of characters and a previous character context; determine a current word representation based on the current character context, wherein the current word representation has a first vector dimensionality; determine, by the one or more processors, a current word context based on the current word representation and a previous word context; determine, by the one or more processors, a next word representation based on the current word context, wherein the next word representation has a second vector dimensionality; and provide, by a display of the electronic device, the next word representation.

U.S. Ser. No. 10/353,796 discloses a method with an integrated development environment to guide development of applications to implement a programming design objective, comprising: analyzing, with a source code analyzer of an integrated development environment, a selected at least a portion of source code stored in memory according to meeting each programming design objective from a set of programming design objectives stored in memory the set of programming design objectives including a plurality of different programming design objectives; selecting, based on the analyzing, at least one programming design objective from the set of programming design objectives stored in memory, the selected at least one programming design objective being determined suitable for the selected at least a portion of source code in development of an application that implements the selected at least one programming design objective, wherein the selected at least one programming design objective is determined suitable based on one of: a determination that the selected at least a portion of source code conforms with the constraints of the selected programming design objective; or a determination that the selected at least a portion of source code fails to conform to one or more constraints of the selected programming design objective, and a further determination that a quick fix may be applied by an update to the at least a portion of source code so that it conforms with the constraints of the selected programming design objective; and outputting, in response to the analyzing with the source code analyzer, by displaying on a display a message corresponding to the selected at least a portion of source code, wherein the message is based on, and indicative of, the selected programming design objective suitable for the selected at least a portion of source code, the displayed message being indicative of at least one of the plurality of different programming design objectives; and wherein the selected at least one programming design objective determined suitable for the selected at least a portion of source code comprises a selected plurality of different programming design objectives determined suitable for the selected at least a portion of source code, and wherein the outputting comprises contemporaneously displaying a plurality of different messages on a display, each displayed different message being based on, and indicative of, a respective different one programming design objective of the selected plurality of different programming design objectives suitable for the selected at least a portion of source code.

U.S. Pat. No. 9,519,464 discloses a method implemented at least in part by a computer comprising: obtaining, at a development environment, a group of code snippets based on method invocations included in the code snippets; selecting a representative code snippet for the group; generating metadata for the representative code snippet, the metadata at least indicating a variation point in the representative code snippet; and storing the representative code snippet in association with the metadata in a knowledge base.

Nevertheless, prior art methods of and systems for code completion suffer from limitations, including lack of flexibility.

SUMMARY

In view of the above circumstances, aspects of present disclosure provide methods and systems for natural language code and comment completion generation.

According to an aspect of the present disclosure, there is provided a method comprising: transmitting, from an application programing interface ("API") server to a backend server, one or more domain knowledge files; receiving, at the API server, a natural language input; transmitting the natural language input from the API server to the backend server; receiving, at the API server, a one or more snippets of executable code, one or more comments, or one or more values.

According to another aspect of the present disclosure, there is provided a system comprising: a terminal; an API server; a backend server; a network connection from the terminal to the API server configured to transmit natural language input; a network connection from the API server to the backend server configured to transmit domain knowledge files; a network connection from the backend server to the API server configured to transmit one or more snippets of executable code, one or more comments, or one or more values; and a network connection from the API server to the terminal configured to transmit one or more snippets of executable code, one or more comments, or one or more values.

According to yet another aspect of the present disclosure, there is provided a non-transitory computer-readable medium containing instructions, which when executed by one or more processors, cause: an API server to transmit to a backend server one or more domain knowledge files; the API server to receive a natural language input; the API server to transmit the natural language string to the backend server; and the API server to receive a one or more snippets of executable code, one or more comments, or one or more values.

DETAILED DESCRIPTION

Embodiments illustrative of the present disclosure will be described with reference to the attached drawings. Note that constituents denoted by the same symbols have the same or similar configurations in respective figures.

As used herein, a comment is non-executable code for the purpose of making the code easier for a human reading the code to understand.

As used herein, a computer means a general-purpose computer configured to read, write, and execute As used herein, machine code is a stream of raw, usually binary, data. A programmer coding in "machine code" normally codes instructions and data in a more readable form such as decimal, octal, or hexadecimal which is translated to internal binary format by a program called a loader.

As used herein, assembly language is any low-level programming language in which there is a very strong correspondence between the instructions in the language and the architecture's machine code instructions.

As used herein, source code is code is any collection of code written in a format such as plain text understandable by persons having skill in the art.

Figure 1:
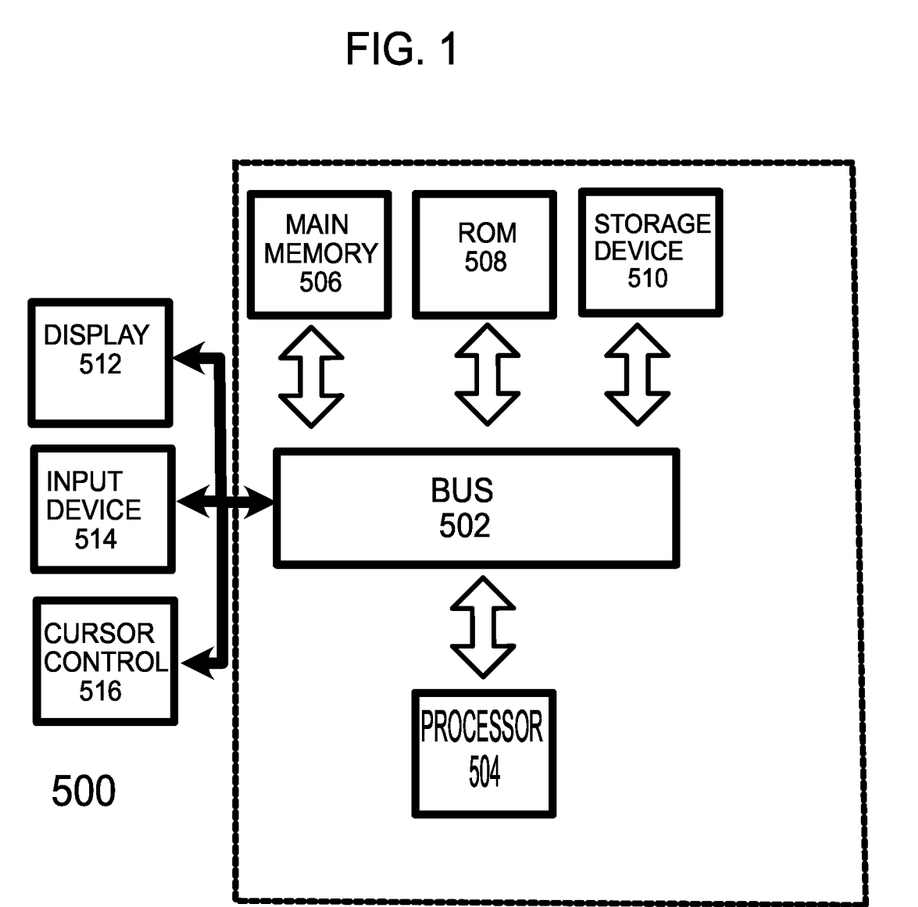
FIG. 1 is a diagram of an example computer useful for implementing embodiments.

FIG. 1 illustrates a general-purpose computer. Special-purpose computers customized to perform the operations specified in the instructions including backend servers, API servers, and terminals are used for implementing embodiments. A server is a computer that listens for incoming requests. Though there are machines made and optimized for this particular purpose, any computer that is connected to a network can act as a server. General-purpose computer 500 includes a bus 502 or other communication mechanism for communicating information, and general purpose microprocessor 504 coupled with bus 502 for processing information.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more application-specific integrated circuits ("ASICs") or field-programmable gate arrays ("FPGAs"), firmware and/or program logic which in combination with the computer system causes or programs computer system 500 to be a special-purpose machine. According to at least one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process operations described herein.

Figure 2:
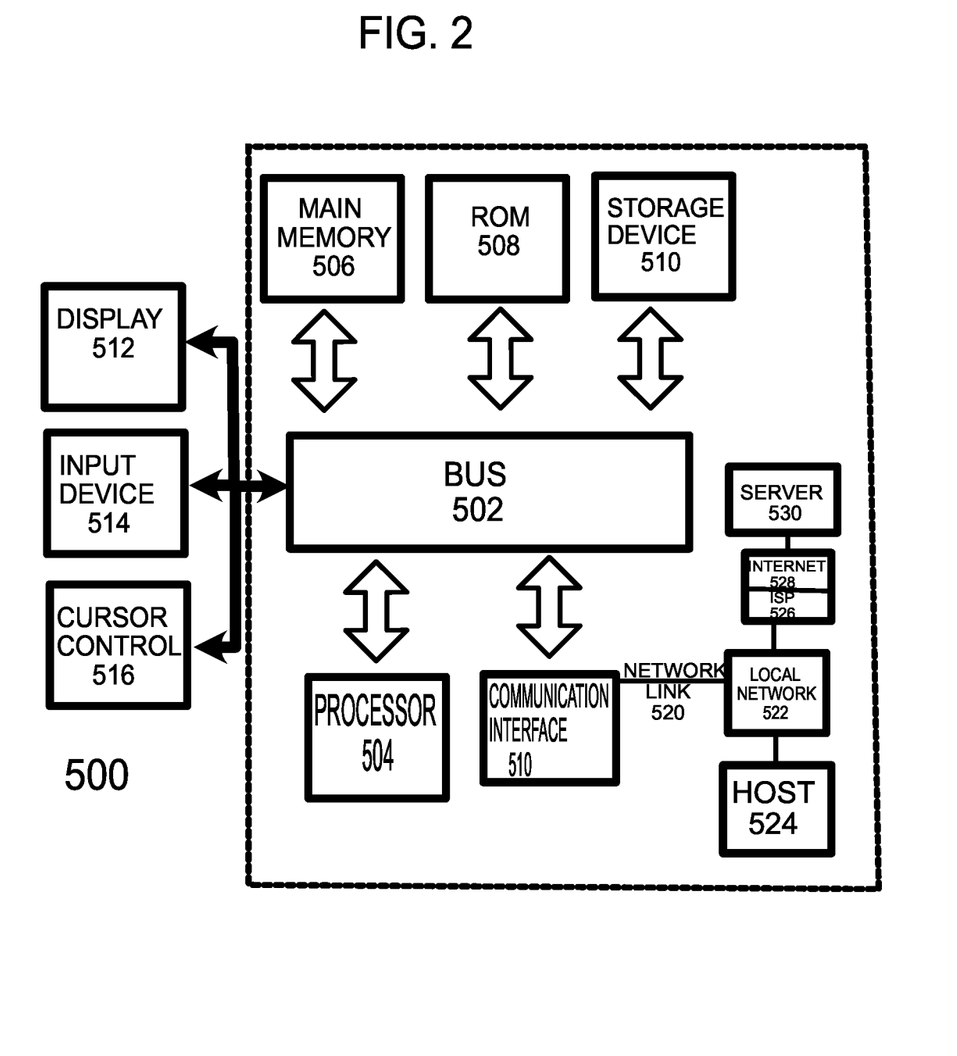
FIG. 2 is a diagram of network features that may be used in embodiments.

FIG. 2 is a diagram of network features that may be used in embodiments. Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In at least one such implementation, communication interface 518 sends and receives one or more of electrical, electromagnetic and optical signals (as with all uses of "one or more" herein implicitly including any combination of one or more of these) that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In at least one embodiment of the Internet example, a server 530 might transmit a requested code for an application program through Internet 528, ISP 526, local network 522 and communication interface 518.

In embodiments, the received code may be one or more of executed by processor 504 as it is received, and/or stored in storage device 510, or other non-volatile storage for later execution.

Figure 3:
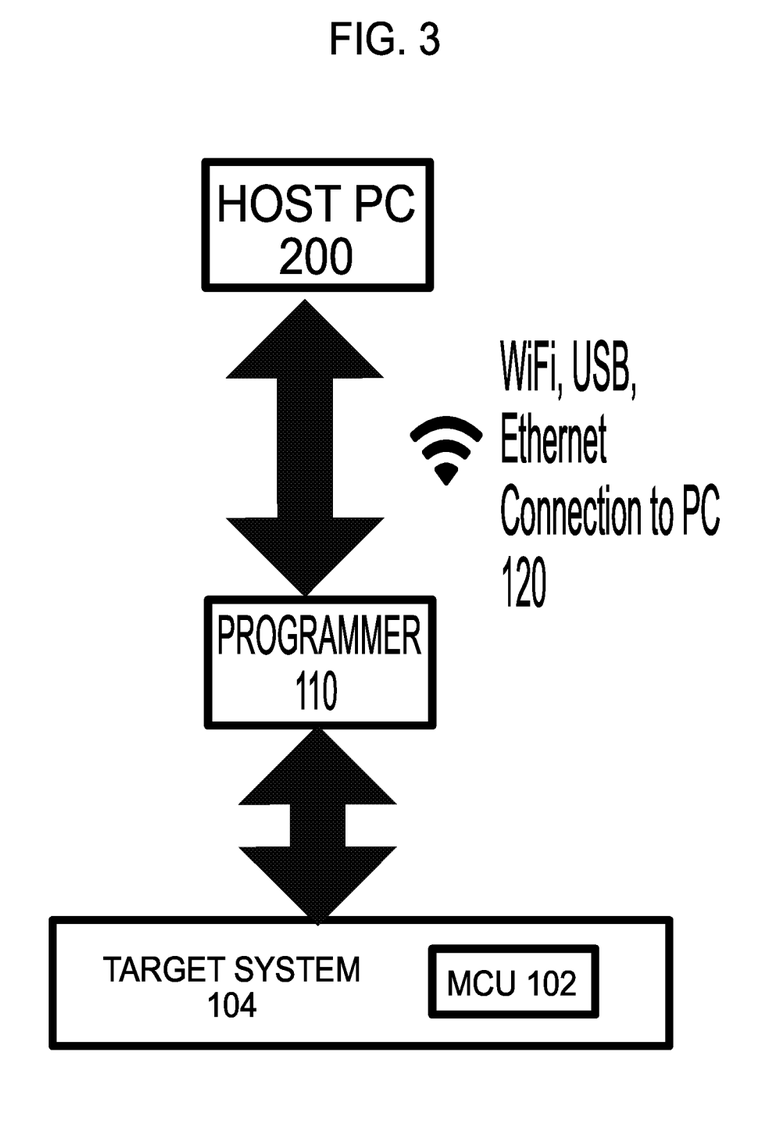
FIG. 3 illustrates a microcontroller unit (MCU) connected to a terminal.

FIG. 3 illustrates a microcontroller unit (MCU) connected to a terminal which can be through a remote network. Embodiments of the present disclosure are useful in programming MCU 102 embedded in a target system 104. Once programmed (e.g., firmware stored into MCU 102), MCU 102 executes code. A microcontroller unit (MCU) is embedded into many modern devices and systems such as transportation, cooking, and medical equipment. MCUs enable sophisticated functionality that cannot be achieved absent an embedded MCU. For instance, events like velocity and acceleration can be measured in real time while code is executing on MCU 102.

Because of the diversity of devices and contexts in with MCUs can be used, there is a need in the art for easier methods of programming MCUs. MCUs vary widely in size, shape, and performance characteristics in accordance with the characteristics of the devices in which they are embedded. There are also a wide variety of programming languages and techniques used. Accordingly, embodiments of the present disclosure are useful in simplifying the task of a programmer of MCUs who must work with multiple types of MCUs.

For example, there often exists a universal asynchronous receiver-transmitter ("USART") module and data ready flag in the status register in many microcontroller units ("MCUs"), but they have a different name for the status register and a different bit name. But simply by posing the question 'What is the name of USART data ready flag?' the present disclosure will give the correct string to replace in the destination file with only domain knowledge files as are provided in the datasheet (which are commonly provided by the vendor).

Figure 4:
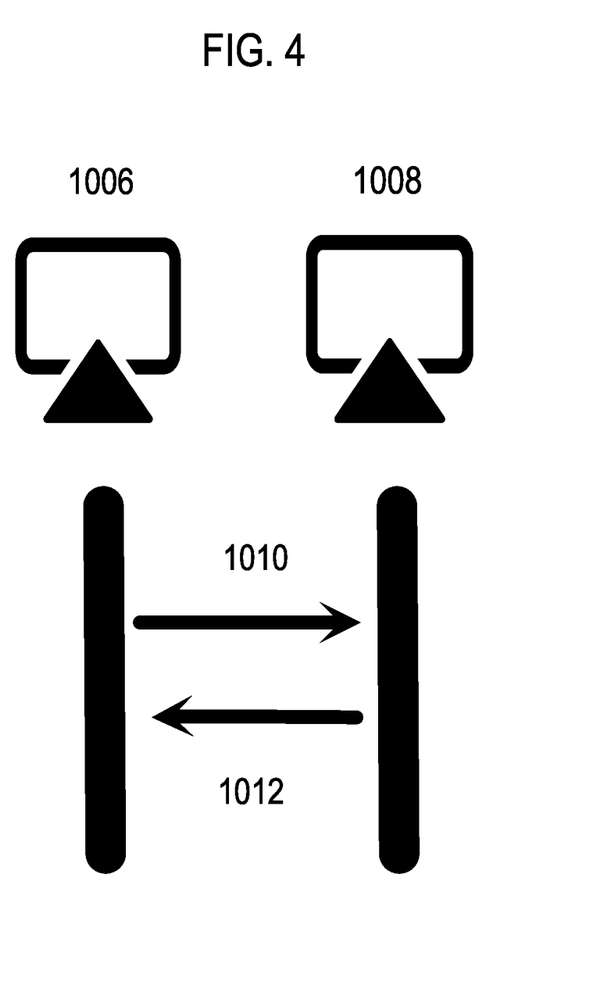
FIG. 4 illustrates an API server connected to a backend server via a network.

FIG. 4 illustrates API server 1006 connected to backend server 1008 via network 1010. The back-end is the code that runs on the server, that receives requests from the clients, and contains the logic to send the appropriate data back to API server 1006 along network 1012. Backend server 1008 also includes a database which will persistently store all of the data for the application for further reference.

Figure 5:
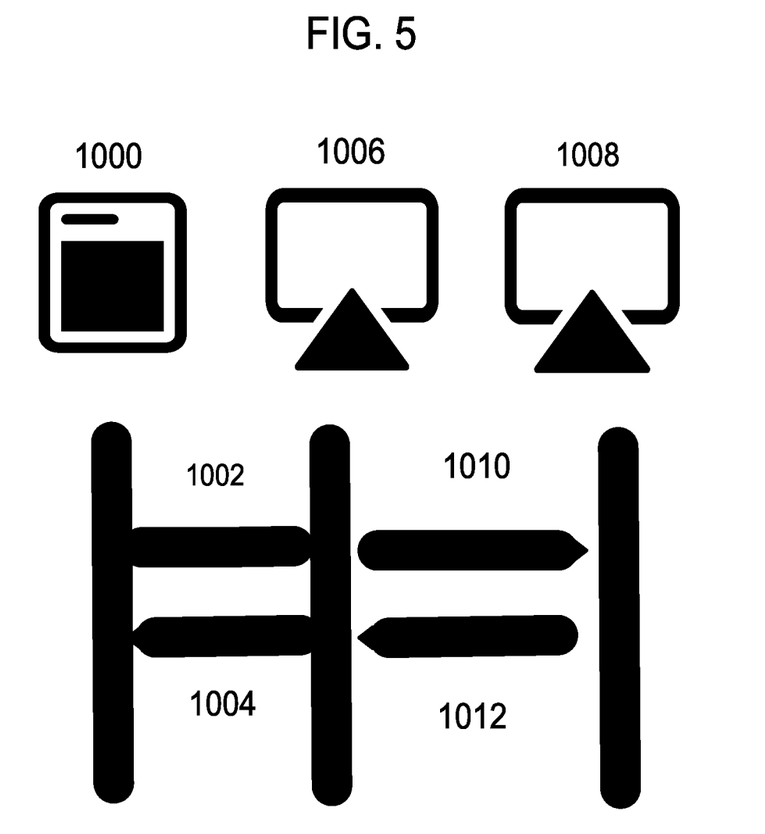
FIG. 5 shows a terminal connected to the API server via a network.

FIG. 5 shows a terminal connected to the API server via a network. The method begins at stage 1002. At stage 1002, API server 1006 receives from client terminal 1000 a document that is formatted in a machine-readable language. At stage 1010, API server 1006 executes instructions that are formatted in a second machine-readable language. This generates a library that includes instructions that are formatted in a second machine-readable language. The library enables the client device to interface with server 1008. Stage 1004 and 1012 represent the reverse direction of the flow of data through this interface.

Figure 6:
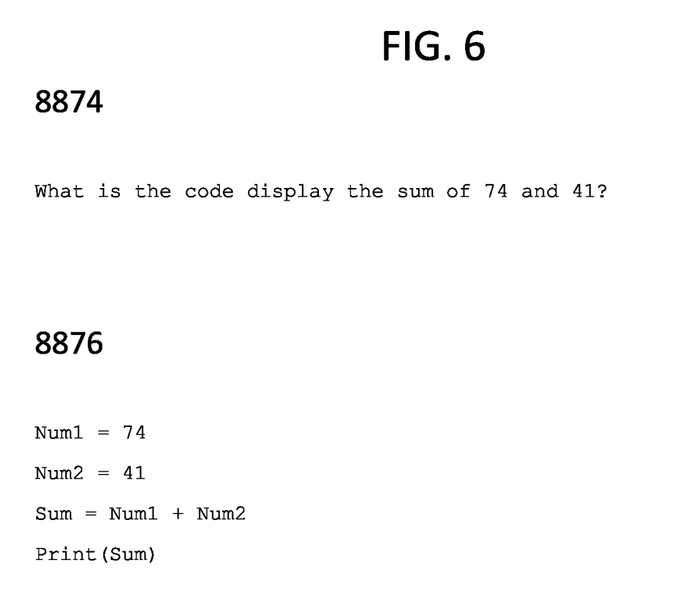
FIG. 6 illustrates an exemplary natural language input and an exemplary one or more snippets of executable code, one or more comments, or one or more values.

FIG. 6 illustrates exemplary natural language input 8774 and exemplary one or more snippets of executable code, one or more comments, or one or more values 8776.

In embodiments, natural language questions and statements from programming language editors are read as they are typed, and a set of corresponding output codes and comments are generated if they exist. Users will be able to feed knowledge files to the quality assurance ("QA") artificial intelligence ("AI") server, then write statements or questions in the editor and domain, activating AI code completion and generation by pressing a certain key combination on the keyboard. According to the example in FIG. 6, natural language input 8774 may be typed by a user, and one or more snippets of executable code, one or more comments, or one or more values 8776 will be returned by the natural language computing and cognitive computing group ("NLCACCG").

If NLCACCG finds an answer, the answer can be used to generate code and/or comments following the rules set in the query line or query statement. Query line in one implementation can take the form written inside code of the comment $QA('NL question') and it will be replaced with the code/ and or comment which AI will return when presented with a question that is in between Q('as a marker for beginning of the question and') as the end marker. If the system finds a larger number of possible answers it will present some final number s of them based on the probability of correctness, and generate a code base of answer that the user selects.

Figure 7:
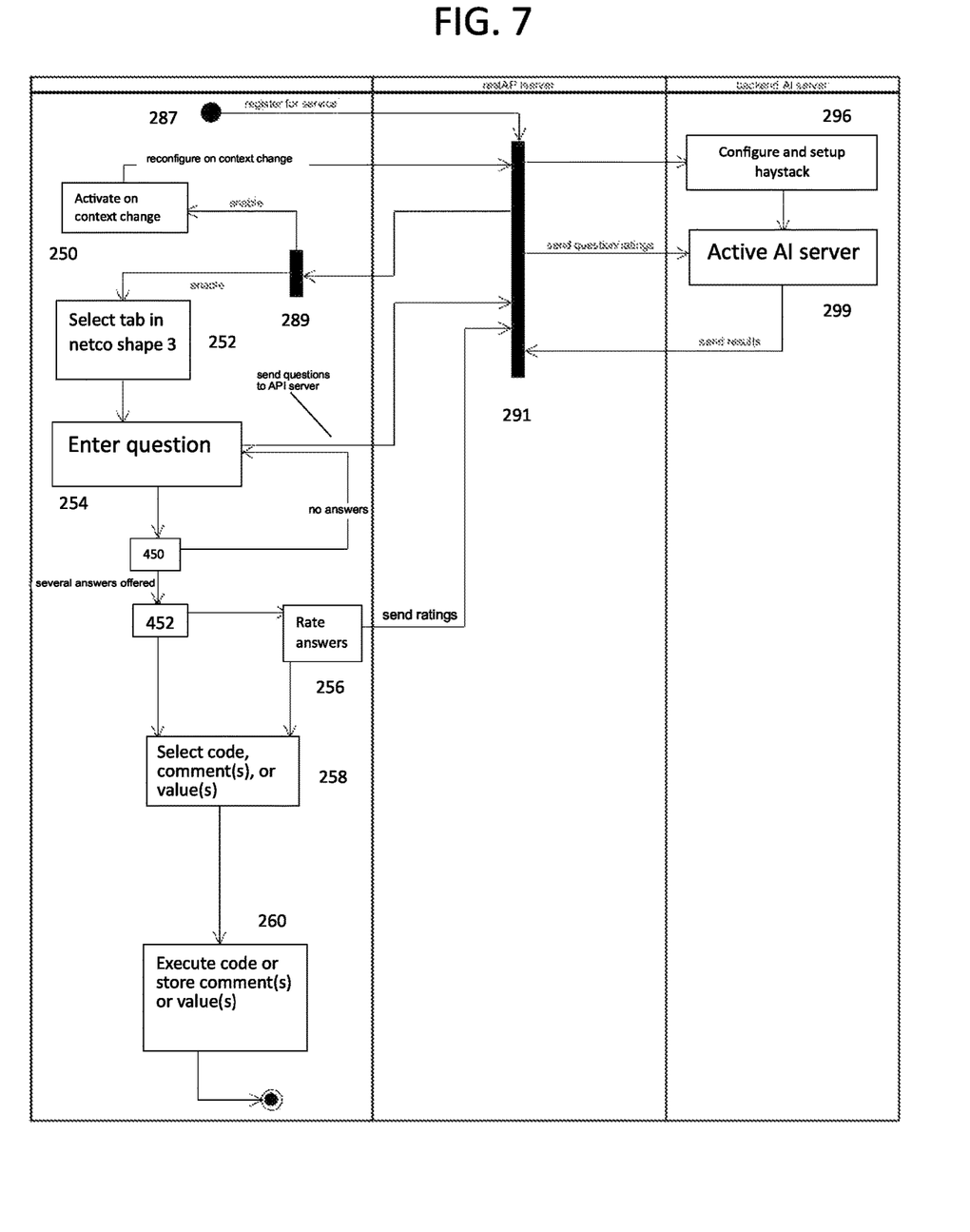
FIG. 7 illustrates a configuration which can be used in embodiments.

FIG. 7 illustrates a configuration which can be used in embodiments.

Device 287 can be the same or a different terminal on which registration for service at API server 291 is made. Backend AI server 296 configures and sets up a haystack. Active AI server 299 is in configuration to provide service. Terminal 289 can enable natural language input 250 which activates a reconfiguration of API server 291 (and downstream, backend AI server 296). Natural language input 252 selects the appropriate domain (tab in netco shape 3). Natural language input 254 enters a question. Natural language input 450 offers answers or returns a null result. Natural language input 452 offers the opportunity to rate answers or not. Natural language input 256 sends ratings. Natural language input 258 selects answers to be used. Natural language input 260 selects actions to be performed based on selected answers.

Backend AI server 296 is capable of taking domain knowledge files as plain text (or any other NL form) and providing answers to NL questions from that domain. A client application is provided that initiates a connection to Backend AI server 296 for feeding the domain knowledge files and also takes a set of files with programming language code as input and makes a set of corresponding output files with the processed question from comments and replaced macros by answers if they exist. Users will be able to feed domain knowledge files to the QA AI server, then preprocess any file with programming language. If a natural language macro expansion detects natural language query in comments of programming language files in predefined syntax, it will find the answer and use the answer string as macro replacements in code following the rules set in query line or query statement.

Figure 8:
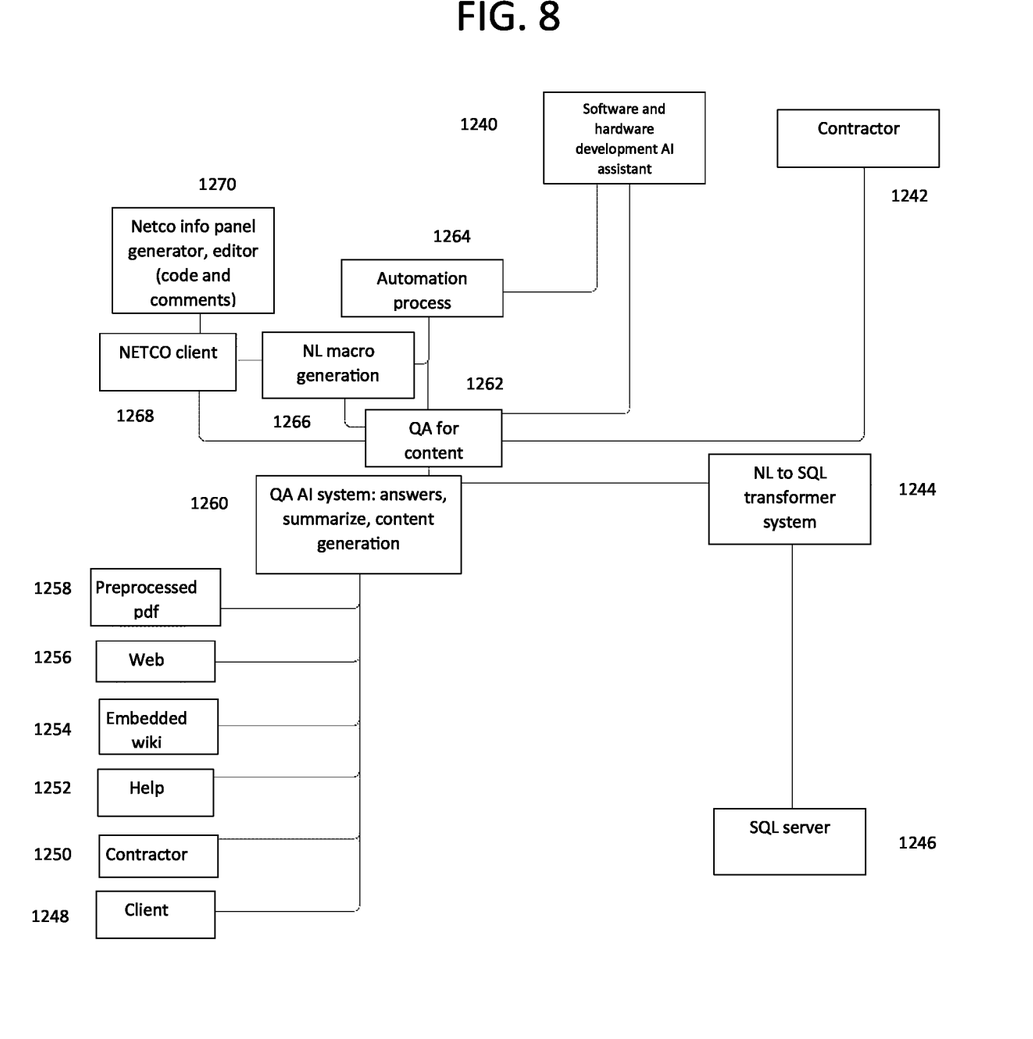
FIG. 8 illustrates another configuration which can be used in embodiments.

FIG. 8 illustrates another configuration which can be used in embodiments.

In this configuration, Contractor 1242 conducts quality assurance for content in the following locations, in some embodiments through the use of a network PC and APIs as previously described herein. NETCO client 1268 is fed by Netco info panel generator 1270. Data fed by Netco info panel generator 1270 is transmitted by NETCO client 1268 for generation of output at 1266 through the operation of automation process 1264.

Automation process 1264 is directed by software and hardware development AI assistant 1240 and contractor 1242. Automation process 1264 generates NL macros 1266. QA AI system 1260 compiles Preprocessed pdf 1258, Web 1256, Embedded wiki 1254, Help 1252, Contractor 1250, and Client 1248. QA AI system 1260 is communicatively connected to NL to SQL transformer system 1244. NL to SQL transformer system 1244 is communicatively connected to SQL server 1256.

The embodiments described above are given for the purpose of facilitating the understanding of the present disclosure and does not intend to limit the interpretation of the present disclosure. The respective elements and their arrangements, conditions, or the like of the embodiment are not limited to the illustrated examples but may be appropriately changed. Further, the constituents described in the embodiment may be partially replaced or combined together.

The following numbered clauses set forth various embodiments of the disclosure:

1. At least one (a) computer-implemented method, or
   (b) terminal by way of (i) at least one processor; and at least one memory storing instructions executed by the at least one processor, (ii) means for or (iii) software module(s) for performing operation(s), or
   (c) system by way of (i) at least one processor; and at least one memory storing instructions executed by the at least one processor (ii) means for or (iii) software module(s) for performing operations(s), or
   (d) signal, or
   (e) transitory or non-transitory computer-readable medium containing instructions which when executed by one or more computers each or collectively comprising one or more processors cause operation(s), according to any one or more of the preceding or following clauses, the operation(s) comprising: transmitting, from an API server to a backend server, one or more domain knowledge files; receiving, at the API server, a natural language input; transmitting the natural language input from the API server to the backend server; receiving, at the API server, a one or more snippets of executable code, one or more comments, or one or more values.

2. A method, terminal, system, signal or, transitory or non-transitory computer-readable medium according to any one or more of the preceding clauses, further comprising transmitting the one or more one or more snippets of executable code, one or more comments, or one or more values from the API server to a terminal.

3. A method, terminal, system, signal or, transitory or non-transitory computer-readable medium according to any one or more of the preceding clauses, further comprising executing a subset of the one or more one or more snippets of executable code, one or more comments, or one or more values, at the terminal.

4. A method, terminal, system, signal or, transitory or non-transitory computer-readable medium according to any one or more of the preceding clauses, further comprising transmitting instructions from a terminal to the API server upon any change in context.

5. A method, terminal, system, signal or, transitory or non-transitory computer-readable medium according to any one or more of the preceding clauses, further comprising registering for service at the API server, by a terminal.

6. A method, terminal, system, signal or, transitory or non-transitory computer-readable medium according to any one or more of the preceding clauses, further comprising transmitting a confirmation of the registration for service from the API server to the terminal.

7. A method, terminal, system, signal or, transitory or non-transitory computer-readable medium according to any one or more of the preceding clauses, comprising transmitting, from an API server to a backend server, one or more domain knowledge files; receiving, at the API server, a natural language input; transmitting the natural language input from the API server to the backend server; receiving, at the API server, one or more comments.

8. A method, terminal, system, signal or, transitory or non-transitory computer-readable medium according to any one or more of the preceding clauses, further comprising transmitting the one or more comments from the API server to a terminal.

9. A method, terminal, system, signal or, transitory or non-transitory computer-readable medium according to any one or more of the preceding clauses, further comprising displaying the one or more comments, at the terminal.

10. A method, terminal, system, signal or, transitory or non-transitory computer-readable medium according to any one or more of the preceding clauses, further comprising transmitting instructions from a terminal to the API server upon any change in context.

11. A method, terminal, system, signal or, transitory or non-transitory computer-readable medium according to any one or more of the preceding clauses, further comprising registering for service at the API server, by a terminal.

12. A method, terminal, system, signal or, transitory or non-transitory computer-readable medium according to any one or more of the preceding clauses, further comprising transmitting a confirmation of the registration for service from the API server to the terminal.

13. A method, terminal, system, signal or, transitory or non-transitory computer-readable medium according to any one or more of the preceding clauses, comprising:
   a terminal;
   an API server;
   a backend server;
   a network connection from the terminal to the API server configured to transmit natural language input;
   a network connection from the API server to the backend server configured to transmit domain knowledge files;
   a network connection from the backend server to the API server configured to transmit one or more snippets of executable code, one or more comments, or one or more values; and
   a network connection from the API server to the terminal configured to transmit one or more snippets of executable code, one or more comments, or one or more values.

14. A method, terminal, system, signal or, transitory or non-transitory computer-readable medium according to any one or more of the preceding clauses, further comprising an I/O device communicatively connected to the terminal.

15. A method, terminal, system, signal or, transitory or non-transitory computer-readable medium according to any one or more of the preceding clauses, further comprising a network connection from the terminal to the API server configured to transmit inputs received at the I/O device.

16. A method, terminal, system, signal or, transitory or non-transitory computer-readable medium according to any one or more of the preceding clauses, further comprising a network connection from the API server to the background server configured to re-transmit representations of inputs received at the I/O device.

17. A method, terminal, system, signal or, transitory or non-transitory computer-readable medium according to any one or more of the preceding clauses, further comprising a network connection from the terminal to the API server configured to provide an alert to changes in context.

18. A method, terminal, system, signal or, transitory or non-transitory computer-readable medium according to any one or more of the preceding clauses, which when executed by one or more processors, cause:
an API server to transmit to a backend server one or more domain knowledge files;
the API server to receive a natural language input;
the API server to transmit the natural language input to the backend server; and the API server to receive one or more one or more snippets of executable code, one or more comments, or one or more values.

19. A method, terminal, system, signal or, transitory or non-transitory computer-readable medium according to any one or more of the preceding clauses, wherein the instructions cause the API server to transmit the one or more one or more snippets of executable code, one or more comments, or one or more values to a terminal.

20. A method, terminal, system, signal or, transitory or non-transitory computer-readable medium according to any one or more of the preceding clauses, wherein the instructions cause the API server to transmit an instruction to display the one or more comments on a device communicatively connected to the terminal.

The embodiments described above are given for the purpose of facilitating the understanding of the present disclosure and does not intend to limit the interpretation of the present disclosure. The respective elements and their arrangements, conditions, or the like of the embodiment are not limited to the illustrated examples but may be appropriately changed. Further, the constituents described in the embodiment may be partially replaced or combined together.

What is claimed is:

1. A method of programming at least one microcontroller unit for a target system(s), comprising:
transmitting, from an application programming interface server to a backend server, one or more domain knowledge files;
receiving, at the application programming interface server, a triggering command and a natural language input;
configuring the application programming interface server based on the natural language input;
transmitting the natural language input from the application programming interface server to the backend server;
receiving, at the application programming interface server, one or more of: one or more snippets of executable code, one or more comments, or one or more values;
in response to the application programming interface server receiving the natural language input, returning one or more answer(s) and at least one request for further input that rates the one or more answer(s);
when a natural language computing and cognitive computing group finds the one or more answer(s), generating executable code or plain comments following rules set in a query line or query statement; and
programming the at least one microcontroller unit.

2. The method according to claim 1, further comprising transmitting the one or more one or more snippets of executable code, one or more comments, or one or more values from the application programming interface server to a terminal.

3. The method according to claim 2, further comprising executing a subset of the one or more snippets of executable code, or one or more values, at the terminal.

4. The method according to claim 1, further comprising transmitting instructions from a terminal to the application programming interface server upon any change in context.

5. The method according to claim 1, further comprising registering for service at the application programming interface server, by a terminal.

6. The method according to claim 5, further comprising transmitting a confirmation of the registration for service from the application programming interface server to the terminal.

7. A method of programming at least one microcontroller unit for a target system(s), comprising:
transmitting, from an application programming interface server to a backend server, one or more domain knowledge files;
receiving, at the application programming interface server, a natural language input;
configuring the application programming interface server based on the natural language input;
transmitting the natural language input from the application programming interface server to the backend server;
receiving, at the application programming interface server, one or more comments;
in response to the application programming interface server receiving the natural language input, returning one or more answer(s) and at least one request for further input that rates the one or more answer(s);
when a natural language computing and cognitive computing group finds the one or more answer(s), generating executable code or plain comments following rules set in a query line or query statement; and
programming the at least one microcontroller unit.

8. The method according to claim 7, further comprising transmitting the one or more comments from the application programming interface server to a terminal.

9. The method according to claim 8, further comprising displaying the one or more comments, at the terminal.

10. The method according to claim 7, further comprising transmitting instructions from a terminal to the application programming interface server upon any change in context.

11. The method according to claim 7, further comprising registering for service at the application programming interface server, by a terminal.

12. The method according to claim 11, further comprising transmitting a confirmation of the registration for service from the application programming interface server to the terminal.

13. A system for programming at least one micro controller unit, comprising:
a terminal;
an application programming interface server;
a backend server;
a network connection from the terminal to the application programming interface server configured to transmit natural language input, which transmission activates configuration of the application programming interface server based on the natural language input;
a network connection from the application programming interface server to the backend server configured to transmit domain knowledge files;
a network connection from the backend server to the application programming interface server configured to transmit one or more snippets of executable code, one or more comments, or one or more values;

a network connection from the application programming interface server to the terminal configured to transmit one or more snippets of executable code, one or more comments, or one or more values;

wherein, in response to the application programming interface server receiving the natural language input, the system returns one or more answer(s) and at least one request for further input that rates the one or more answer(s);

when a natural language computing and cognitive computing group finds the one or more answer(s), the system generates executable code or plain comments following rules set in a query line or query statement; and wherein the system programs the at least one microcontroller unit.

14. The system according to claim 13, further comprising an input/output device communicatively connected to the terminal.

15. The system according to claim 14, further comprising a network connection from the terminal to the application programming interface server configured to transmit inputs received at the input/output device.

16. The system according to claim 15, further comprising a network connection from the application programming interface server to the background server configured to re-transmit representations of inputs received at the input/output device.

17. The system according to claim 13, further comprising a network connection from the terminal to the application programming interface server configured to provide an alert to changes in context.

18. A non-transitory computer-readable medium containing instructions, which when executed by one or more processors, cause:

an application programming interface server to transmit to a backend server one or more domain knowledge files;

the application programming interface server to receive a natural language input, which activates configuration of the application programming interface server based on the natural language input;

the application programming interface server to transmit the natural language string to the backend server; and the application programming interface server to receive a one or more snippets of executable code, one or more comments, or one or more values;

in response to the application programming interface server receiving the natural language input, returning one or more answer(s) and at least one request for further input that rates the one or more answer(s);

when a natural language computing and cognitive computing group finds the one or more answer(s), generating executable code or plain comments following rules set in a query line or query statement; and programming at least one microcontroller unit.

19. A computer-readable medium according to claim 18, wherein the instructions cause the application programming interface server to transmit one or more comments to a terminal.

20. A computer-readable medium according to claim 19, wherein the instructions cause the application programming interface server to transmit an instruction to display the one or more comments on a device communicatively connected to the terminal.

* * * * *